(12) United States Patent
Zchori et al.

(10) Patent No.: US 10,816,229 B2
(45) Date of Patent: Oct. 27, 2020

(54) HARVESTING ENERGY FROM HUMIDITY FLUCTUATIONS

(71) Applicant: TERMOTERA LTD, Moshav Amirim Amirim Via Karmiel (IL)

(72) Inventors: Dror Zchori, Petach Tikva (IL); Jonathan Nathan, Zipporri (IL); Jeremy Rutman, Tel Aviv (IL)

(73) Assignee: Termotera LTD, Amirim (IL)

( * ) Notice: Subject to any disclaimer, the term of this patent is extended or adjusted under 35 U.S.C. 154(b) by 105 days.

(21) Appl. No.: 15/736,301

(22) PCT Filed: Jun. 24, 2016

(86) PCT No.: PCT/IL2016/050677
§ 371 (c)(1),
(2) Date: Dec. 14, 2017

(87) PCT Pub. No.: WO2016/207898
PCT Pub. Date: Dec. 29, 2016

(65) Prior Publication Data
US 2018/0180308 A1 Jun. 28, 2018

Related U.S. Application Data

(60) Provisional application No. 62/184,157, filed on Jun. 24, 2015.

(51) Int. Cl.
*B01D 53/02* (2006.01)
*F24F 3/147* (2006.01)
(Continued)

(52) U.S. Cl.
CPC .......... *F24F 3/147* (2013.01); *B01D 53/0407* (2013.01); *B01D 53/261* (2013.01);
(Continued)

(58) Field of Classification Search
CPC ........... B01D 2252/10; B01D 2253/10; B01D 2253/106; B01D 2253/11; B01D 2257/08;
(Continued)

(56) References Cited

U.S. PATENT DOCUMENTS

| 1,206,977 A | 3/1913 | Batter |
| 2,138,690 A | 10/1934 | Altenkirch |

(Continued)

FOREIGN PATENT DOCUMENTS

| CN | 103835393 A | 6/2014 |
| DE | 202012103631 U1 | 11/2012 |
| GB | 433639 A | 8/1935 |

*Primary Examiner* — Christopher P Jones (57) ABSTRACT

The innovation uses the disparity between dry and wet conditions of the air, by storing the 'dryness' or 'wetness' in a hygroscopic material. When the surrounding air is drier or wetter than the hygroscopic material, the potential energy difference between moisture in the air and that in the material can be used as a way of transporting heat from the material to the air and vice versa. A simple way this energy can be used is for heating and cooling of a building. For example, a large storage of adsorbing material can be dried in the hot summer, and allowed to re-adsorb water in the cold winter, thus gaining heat that can be used for domestic heating.

7 Claims, 11 Drawing Sheets

(51) Int. Cl.
*E04B 5/48* (2006.01)
*B01D 53/26* (2006.01)
*E04D 13/17* (2006.01)
*F24F 5/00* (2006.01)
*B01D 53/04* (2006.01)
*F24F 110/20* (2018.01)
*F24F 110/10* (2018.01)

(52) U.S. Cl.
CPC .............. *B01D 53/263* (2013.01); *E04B 5/48* (2013.01); *E04D 13/17* (2013.01); *F24F 5/0014* (2013.01); *F24F 5/0092* (2013.01); *B01D 2252/10* (2013.01); *B01D 2253/10* (2013.01); *B01D 2253/106* (2013.01); *B01D 2253/11* (2013.01); *B01D 2257/80* (2013.01); *B01D 2259/4591* (2013.01); *F24F 2110/10* (2018.01); *F24F 2110/20* (2018.01); *Y02B 10/20* (2013.01)

(58) Field of Classification Search
CPC ........ B01D 2259/4591; B01D 53/0407; B01D 53/261; B01D 53/263; E04B 5/48; F24F 2110/10; F24F 2110/20; F24F 5/0014; F24F 5/0092; Y02B 10/20
See application file for complete search history.

(56) References Cited

U.S. PATENT DOCUMENTS

| | | | | |
|---|---|---|---|---|
| 2,138,689 A | * | 11/1938 | Altenkirch | E03B 3/28 95/115 |
| 2,700,537 A | * | 1/1955 | Pennington | F24F 3/1423 261/83 |
| 2,723,837 A | * | 11/1955 | Pennington | F24F 3/1423 165/229 |
| 6,145,588 A | * | 11/2000 | Martin | F24F 3/147 165/133 |
| 6,364,942 B1 | | 4/2002 | Felber et al. | |
| 6,403,216 B1 | * | 6/2002 | Doi | D01F 6/70 428/364 |
| 9,212,826 B2 | * | 12/2015 | Everett | F24F 3/14 |
| 9,920,963 B1 | * | 3/2018 | Rafalovich | F25B 13/00 |
| 2006/0053810 A1 | * | 3/2006 | Cressy | F24F 11/0008 62/176.6 |
| 2006/0093713 A1 | * | 5/2006 | Jurkovich | A23N 17/005 426/511 |
| 2008/0230206 A1 | * | 9/2008 | Lestage | F24F 3/147 165/48.1 |
| 2008/0295695 A1 | * | 12/2008 | Takeuchi | A01G 25/02 96/108 |
| 2011/0287705 A1 | * | 11/2011 | Kamp | A01G 9/246 454/239 |
| 2013/0013117 A1 | * | 1/2013 | Desrochers | F24F 7/08 700/276 |
| 2013/0055736 A1 | * | 3/2013 | Everett | F24F 3/14 62/92 |
| 2013/0263530 A1 | | 3/2013 | Shiao | |
| 2013/0255287 A1 | * | 10/2013 | Forkosh | F24F 3/1417 62/94 |
| 2013/0305752 A1 | * | 11/2013 | Martin | F24F 3/1417 62/91 |
| 2013/0340449 A1 | * | 12/2013 | Kozubal | F25B 15/00 62/92 |
| 2015/0233589 A1 | * | 8/2015 | Betts | F24F 3/147 203/23 |
| 2018/0347406 A1 | * | 12/2018 | Friesth | F01K 3/00 |

* cited by examiner

HARVESTING ENERGY FROM HUMIDITY FLUCTUATIONS

This patent claims priority from U.S. provisional patent application 62/184,157 filed 24 Jun. 2015.

1. FIELD OF THE INVENTION

The present invention relates to the field of temperature and humidity control.

2. BACKGROUND OF THE INVENTION

A large portion of domestic energy expenditure is spent on maintaining comfortable conditions within buildings. Comfort is a function of both temperature and humidity levels. Temperature variations, to a certain degree, are ubiquitous to almost any climate and can be used to maintain stable temperatures by using thermal mass that acts as a heat buffer and reduces the peak (maximal and minimal) temperatures in the building. Thermal mass is mostly suitable for climates with strong temperature variations, and requires the usage of heavy construction elements (stone, earth, water) in order to provide noticeable gains in comfort.

Water vapor in the air that adsorbs onto or into an adsorptive material transfers a significant amount of energy to the material. The relative humidity also fluctuates daily and seasonally, but no commercial solution is currently offered that utilizes these fluctuations in relative humidity in order to harvest energy. This invention deals with the utilization of relative humidity fluctuations in order to stabilize the peak temperature and humidity within buildings, thus reducing the need for more expensive energy measures (electricity, gas) to control indoor temperature and humidity.

Between the compounded factors of increasing technological advancement of an ever-increasing global population on the one hand, and global warming (be it anthropogenic or not) on the other hand, the energy expended on temperature and humidity control represents a rising fraction of the total worldwide energy load. There is thus a pressing need for novel, energy-efficient temperature and humidity control.

3. SUMMARY OF THE INVENTION

Wind and solar energy are ubiquitous and we have learned to harvest them and transform these sources of energy into forms that are easily usable. Changes in the relative humidity of the air also "arrive at our doorstep" and there are significant amounts of energy that can be harvested from them. This patent concerns a novel way to use this energy, a source that has been largely overlooked even in this age of environmental awareness and emphasis on renewable sources.

The innovation uses the disparity between dry and wet conditions of the air, by storing the 'dryness' or 'wetness' in a hygroscopic material. When the surrounding air is drier or wetter than the hygroscopic material, the potential energy difference between moisture in the air and that in the material can be used as a way of transporting heat from the material to the air and vice versa. A simple way this energy can be used is for heating and cooling of a building. For example, a large storage of adsorbing material can be dried in the hot summer, and allowed to re-adsorb water in the cold winter, thus gaining heat that can be used for domestic heating.

One implementation consists of a large mass of porous, hygroscopic material forming a significant fraction of the volume of a building structure, for instance comprising a large portion of the walls, floors, and ceilings of the building or house.

The hygroscopic material is enclosed in a largely gastight membrane or layer such as a gas-impermeable paint, tar, or the like. Airflow is provided into and out of the mass of the hygroscopic material at one or more points, by means of blowers, vents, pumps, natural convection, or the like. This airflow can originate either from within the building envelope or from the surroundings, and can also be exhausted either into the building or to the surroundings.

As will be clear to one skilled in the art, when the relative humidity of the air being forced into the hygroscopic material of the building is higher than that of the 'equilibrium humidity' of the hygroscopic material (this being the level of humidity of air that would be in equilibrium with the current moisture content of the material) humidity will be adsorbed by this material, and it will as a result heat up, releasing a relatively large amount of energy, namely the heat of adsorption which comprises the latent heat of evaporation and the binding energy between water and the adsorbing material.

Analogously, when the humidity of the air being introduced into the system is less than that of the 'equilibrium humidity' of the material, the air will absorb moisture from the hygroscopic material and its temperature will decrease.

Given that there are two possible air sources and sinks (within and without the building envelope), and further given the aforementioned largely predictable daily pattern of variations in temperature and humidity, it is possible to employ the large hygroscopic masses of the building towards buffering the daily and even seasonal variations in external temperature, thus providing a relatively steady temperature and humidity within the building. This effect is reached not simply by the thermal mass of the building materials, but comprises a far larger effect of cooling/heating by means of adsorption/desorption as described above.

The foregoing embodiments of the invention have been described and illustrated in conjunction with systems and methods thereof, which are meant to be merely illustrative, and not limiting. Furthermore just as every particular reference may embody particular methods/systems, yet not require such, ultimately such teaching is meant for all expressions notwithstanding the use of particular embodiments.

4. BRIEF DESCRIPTION OF THE DRAWINGS

Embodiments and features of the present invention are described herein in conjunction with the following drawings.

5. DETAILED DESCRIPTION OF PREFERRED EMBODIMENTS

5.1 General Concept and One Possible Embodiment

The present invention will be understood from the following detailed description of preferred embodiments, which are meant to be descriptive and not limiting. For the sake of brevity, some well-known features, methods, systems, procedures, components, circuits, and so on, are not described in detail.

The most general statement of the invention is that it allows exploitation of humidity variations as a source of energy, by storing moisture or "dryness" in hygroscopic material. One practical method to use this stored energy is for heating and cooling, and a particularly apt use of this heating and cooling potential is in dwellings, where a. the desired temperature variations are relatively small, being tens of degrees celsius or less, and b. the building itself may be built, in part, of materials that are inherently hygroscopic.

In such applications, the invention uses a large mass of hygroscopic material for heating and cooling. This mass may comprise or be part of the walls, ceiling, floor, or other parts of the building, or may be stored outside or inside the building in containers suited for the purpose. This possibility of incorporating large masses allows use of lower cost material (e.g. with lower hygroscopic properties) and makes the system economical.

Figure 1:
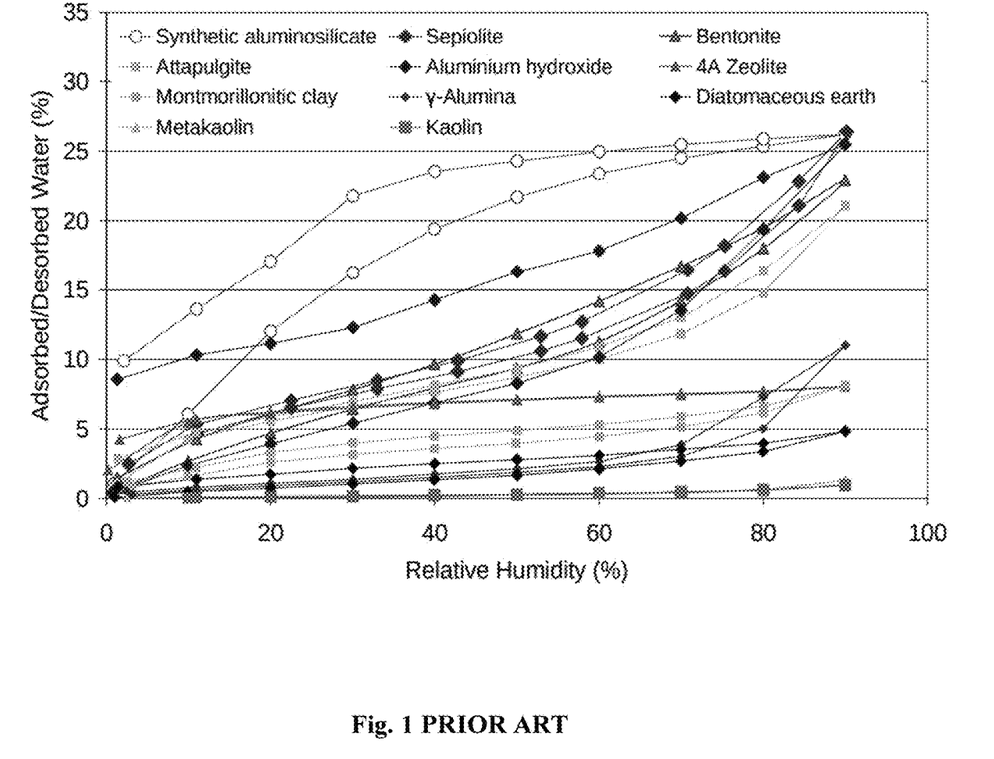
FIG. 1 shows absorption capability of different raw materials used in the ceramic industry.

Many hygroscopic materials may be suitable for these purposes. A few of the very common raw materials of the ceramic industry that have hygroscopic properties are seen in FIG. 1. Hygroscopic materials can be organic like cellulose or inorganic like different salts. Calcium Chloride, for example, is a very common salt that can absorb up to 2 times its weight at 50% relative humidity. It can be used in a mixture with other materials to increase adsorptivity. As will be described, an arrangement of airflow paths into the system increases the heat and mass transfer (of water vapor) into and out of the absorptive material. The permeability of the hygroscopic material to gas (in our case generally air) will determine how fast the system will be able to release and absorb water vapor and energy. The permeability can be affected by the grain size and shape of the hygroscopic material, and future research will determine which geometry is optimal for vapor transport.

In some embodiments, air can be forced into or out of the mass of the hygroscopic material at one or more points, by means of blowers, vents, pumps, or the like, or by natural convection, use of wind chimneys, or the like. This airflow intake can originate either from within the building envelope or from the surroundings, and can also be released either within the building envelope or to the surroundings.

When the relative humidity of the air being forced into the hygroscopic material of the building is lower than the 'equivalent humidity' of the hygroscopic material (ie. the humidity of air that would be at equilibrium with the current moisture content of the material), the air will absorb moisture from the hygroscopic mass and will decrease in temperature.

Analogously, when the humidity of the air being introduced into the hygroscopic mass of the system is higher than the 'equilibrium humidity' of this mass, moisture from the air will be absorbed by the material, and it will as a result heat up, releasing the heat of absorption (which comprises the latent heat of vaporization of water and the water binding energy of the material).

With two possible air sources and sinks (within and without the building envelope), and further given the large and generally somewhat predictable daily variations in temperature and humidity, it is possible to employ the hygroscopic mass towards buffering the daily and even seasonal variations in external temperature and humidity, thus providing a relatively steady temperature and humidity within the building, all with an almost entirely passive system (energy being added only to move air and open/close valves). Note that this buffering effect is due not only to the thermal mass of the building materials, but rather is greatly amplified by the cooling/heating effects of humidification/dehumidification described above.

We further note that heat can be added to or removed from the building interior by either moving masses of warm or cold air into the interior (convection) or by means of conduction of heat out of the hygroscopic mass and into the house interior, or vice versa. Thus the walls may be used not only to store hygroscopic material at a given state of moisture content, but also to exchange heat with the building interior. For such purposes, the thermal conductivity between walls and interior surfaces may be kept as high as possible, and the thermal conductivity between walls and exterior surfaces kept as low as possible (for example by adding insulating material between the 'hygroscopically active' part of the wall, and the exterior of the building). Due to the extremely large surface areas available for heat transfer, relatively low temperature differences suffice to heat/cool the building interior, making the system highly efficient.

5.1.2 Daily Temperature and Humidity Usage Example

To cool in summer, part or all of the hygroscopic material may be 'charged' with moisture overnight and in the early morning by blowing large volumes of ambient (outside) air through the material. The material will heat up to some degree due to its absorption of moisture, but will also be cooled to an extent due to the cool night air. To keep the material as cool as possible, it may be found advantageous to blow very large quantities of air through the material, releasing this heated air to the surroundings. This will tend to cool the material, as the maximum amount of heat energy that can be released by the material is fixed (by the maximum relative humidity (hereinafter RH) achieved during the night, the mass of the material, and its physical properties), while the amount of heat that may be pulled out of the material is limited only by the temperature difference between the material and ambient, and the total mass of air pushed through it. Thus by blowing large masses of air through the material, the dawn can be greeted with the material at nearly 'full charge' (i.e. having a high moisture content at equilibrium with the high humidity of early morning) but also nearly as cool as the night air. This puts the system in good position for the heat of the day. As the day begins to heat up, air either from the surroundings or from within the building is passed through the material. As this air will have a lower relative humidity than that with which the material equilibrated, moisture will be absorbed by the air, which will cool down as a result. This is in addition to the 'direct' thermal effect of warmer air passing through the cooler mass of hygroscopic material, with the air being cooled and the material being warmed. As long as the incoming air is not too hot, the net effect (from heat transfer and desorption) on the hygroscopic material is cooling, while the effect upon the air is in all cases of cooling. The cooled air may be directed into the building interior, or may be exhausted from the building. In the latter case, counter-current exchange is ideally used by means of (for example) a heat exchanger that allows the cool outgoing air to cool the incoming warm air. The heat exchanger may also be built into the building elements of the system.

The process described above may be repeated daily, weekly or seasonally. This simple cycle may be used to heat as well, by bringing the hygroscopic mass into equilibrium with relatively dry air (e.g. around noon), and blowing humid ambient air through it at night (when the relative humidity will generally have increased.)

It appears that such use of ambient daily or seasonal humidity variations, to store moisture in hygroscopic materials for beneficial release at times when cooling is desired, and with the same system to store 'dryness' allowing the material to absorb moisture when heating is desired, is a novel means for heating and cooling.

A similar method which is widely used in construction, is by employing a large thermal mass in the building construction. That mass absorbs energy when the surrounding gets hotter and releases energy when the surroundings get colder and by doing so stabilizes the temperature the building interior. The combination of both humidity energy storage and thermal energy storage in one system as described above gives a combined effect but with an additional physical mechanism that has great advantages as can be appreciated in the quantitative example of the next section.

Another advantage of the one embodiment of the current system over passive thermal mass is that since the airflow is controlled, the heating/cooling effect can be controlled as well. In cases in which the effect is in the 'wrong direction' (i.e. when extremely hot air entering the system cannot be cooled below the current indoor air temperature when cooling, or when extremely cold incoming air cannot be heated above the current indoor air temperature when heating) the airflow can be stopped.

A further advantage of the current system over passive thermal mass concerns the sealing requirements. To keep a thermal mass close to its initial temperature it must be well insulated. To keep a mass of hygroscopic material near its original equivalent humidity, it must be sealed to be gastight. This in many situations may be more easily done (e.g. by means of roofing sealers, epoxies, glazing, paints or the like) when compared to the effort required to achieve highly thermally-insulating barriers.

As mentioned above the current system actually employs both methods (thermal mass and hygroscopic mass) as a natural consequence of the thermal mass of the material and its hygroscopic properties.

5.1.3 Quantitative Example

We now consider a quantitative example. The heat of evaporation for water is 2257 KJ/Kg and with addition of the binding energy, the total energy of absorption for silica gel reaches 2500 KJ/Kg, or that for bentonite+CaCl2 reaches 3500 KJ/Kg.

By way of comparison, the thermal capacity of concrete thermal mass is about 0.9 KJ/Kg*K. Thus for a change of 10 degrees C. (degrees C. having the same magnitude as degrees Kelvin), a kilogram of concrete will absorb/release about 10 kJ. However consider that daily variations in atmospheric relative humidity can easily vary on average from 65% RH in the early morning to 20% RH at midday. At equilibrium with this daily variation, a kilogram of bentonite will vary its water content from about 16% to 6% (by weight), for an absorbed/desorbed water content of 100 g, corresponding to 350 KJ for the bentonite/CaCl2 mixture mentioned above—around 35 times the energy absorbed/released by the thermal mass of 1 kg of concrete.

These figures are calculated for simple raw bentonite mixtures, and a tailored material which has been designed (for example) to absorb/release a maximum amount of water between 25% and 60% RH, may well absorb/release even more than the 350 KJ/kg figure calculated above.

5.2 Opportunistic Humidity and Dryness Harvesting

There is great interest in the possibility for storing energy in absorption desorption mechanisms. In the systems published so far the energy source for charging (drying) the system, comes from solar collectors, waste heat, etcetera. Often water is added externally for evaporative cooling. The novel approach used here involves 'foraging' for the right ambient conditions (in the sense of waiting for these condition to occur naturally in the course of the day or season). By so doing the system not only stores energy but harvests this generally unused renewable source of energy.

5.3 The Integration with the Building

5.3.1 Definitions

An Assembly combines the functionality of an absorption reservoir with the normal function of an building element such as a wall, floor, ceiling, roof or even a furnishing like a big bench along an outside facing wall. All the different embodiments comprise a large mass of moisture-absorptive material, airflow channels, and at least 2 vents connecting the hygrosopic material to outdoor air, indoor air, or both.

A Structural component is a structure that has the same functionality of the 'assembly' above.

Figure 2:
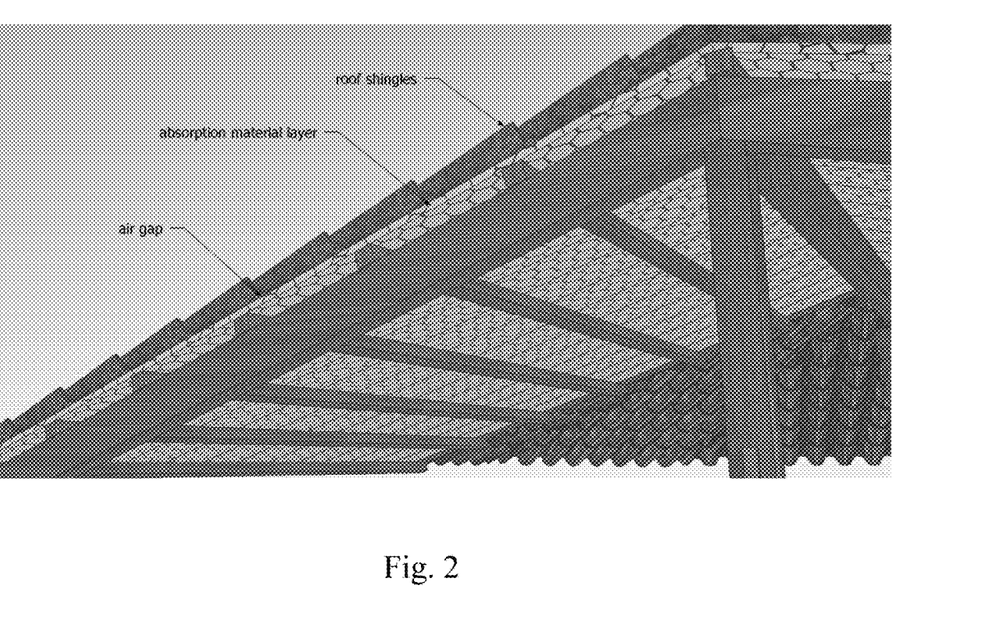
FIG. 2 shows an embodiment of the invention implemented as a part of a roof of the building.
Figure 3:
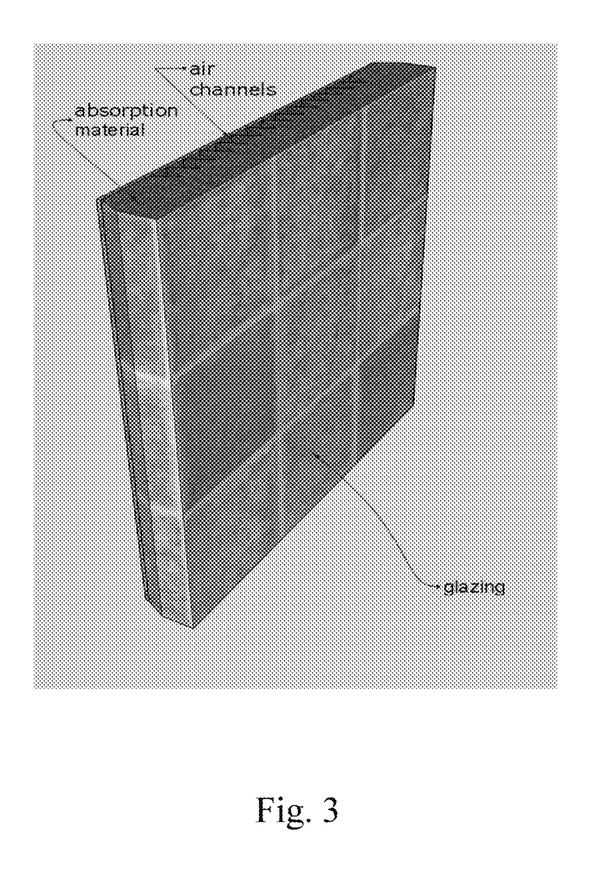
FIG. 3 shows an embodiment of the invention implemented as a set of wall bricks.
Figure 4:
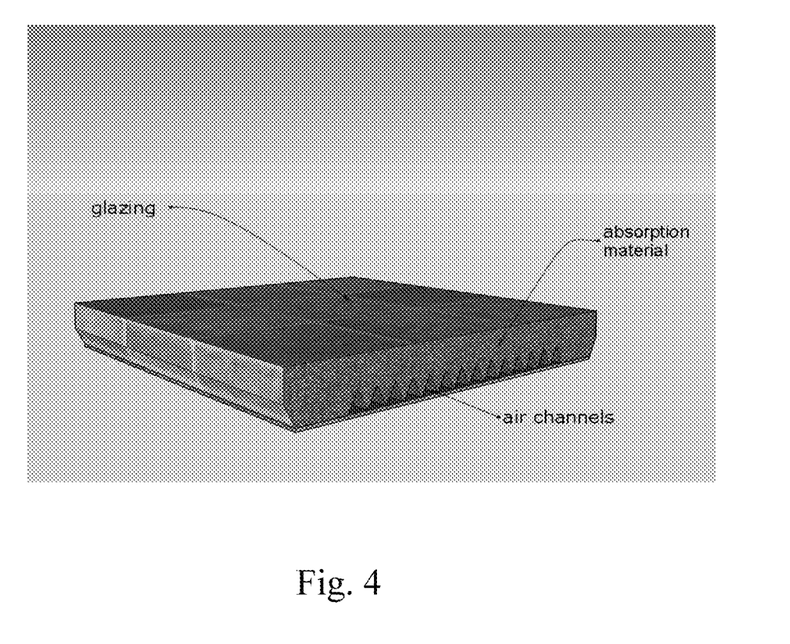
FIG. 4 shows an embodiment of the invention implemented as a floor tile.
Figure 5:
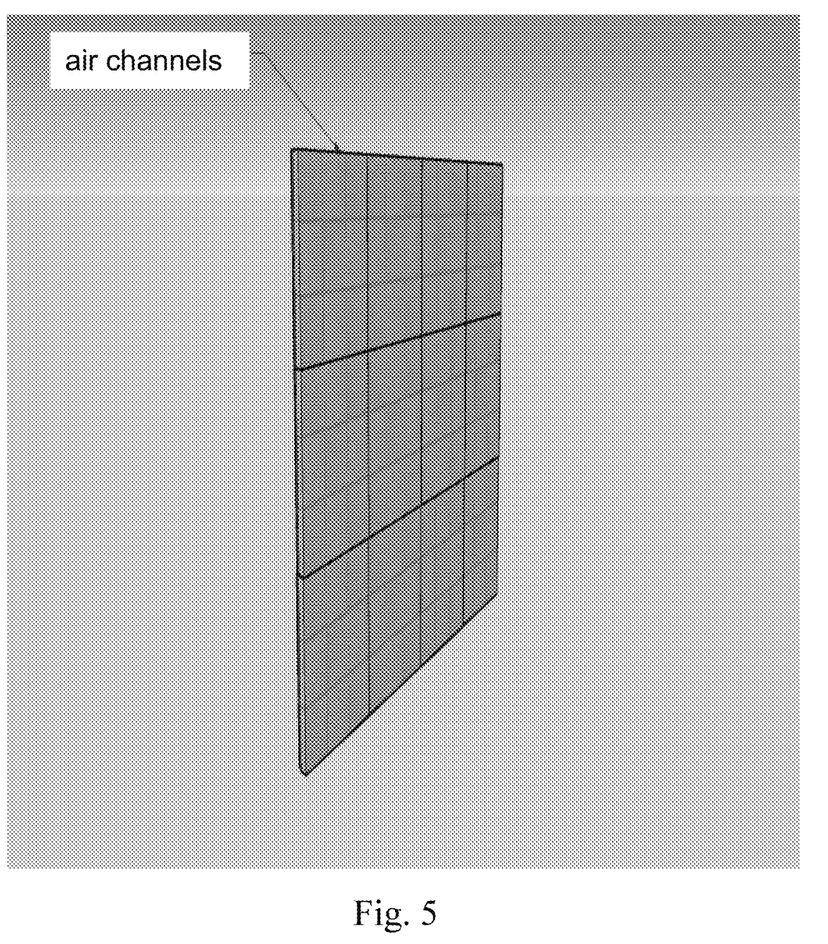
FIG. 5 shows an embodiment of the invention assembled as a wall.

Air flow channels can be the following:

1. separated channels within the material giving the possibility for air to flow from the vent, into the material, through the material, and out of the material.
2. Channels that are formed by an air gap between the material and its encapsulation material.
3. Channels that are formed between the assembly and the nearest surrounding, such as another building element. In the case of FIG. 2 this nearest surrounding is the roof, with the figure showing an air gap between the roof shingles and the absorption material.
4. Channels that are formed by the arrangement of the material as in FIGS. 3, 4, and its assembly FIG. 5, and FIG. 6 and its assembly FIG. 7
5. Channels that are formed by air paths between the material particles. If the material is in granular form the air flow paths are between the granules. Internal air paths of various forms may also be introduced into the absorption material in its manufacturing process.

6. Channels employing one or a combination of the possibilities above.

Figure 6:
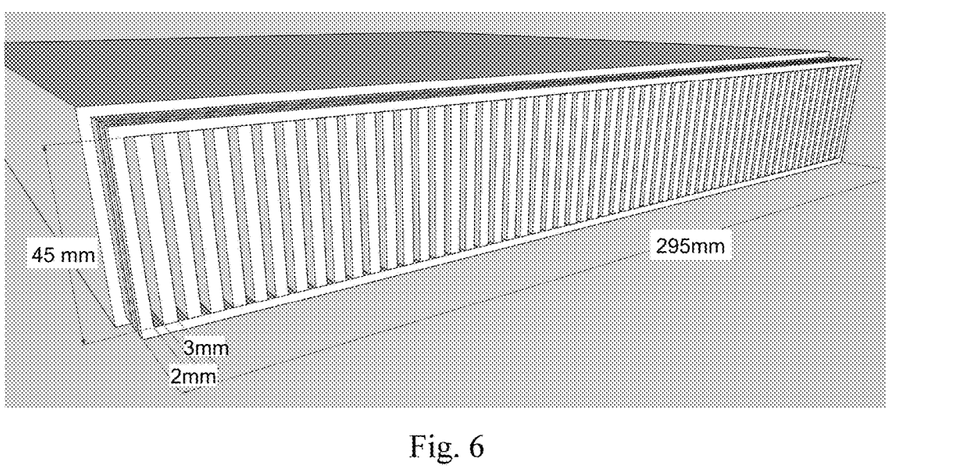
FIG. 6 shows a side view of a high surface area energy-storing building element of one embodiment of the invention. This can be assembled as floor wall or ceiling.
Figure 7:
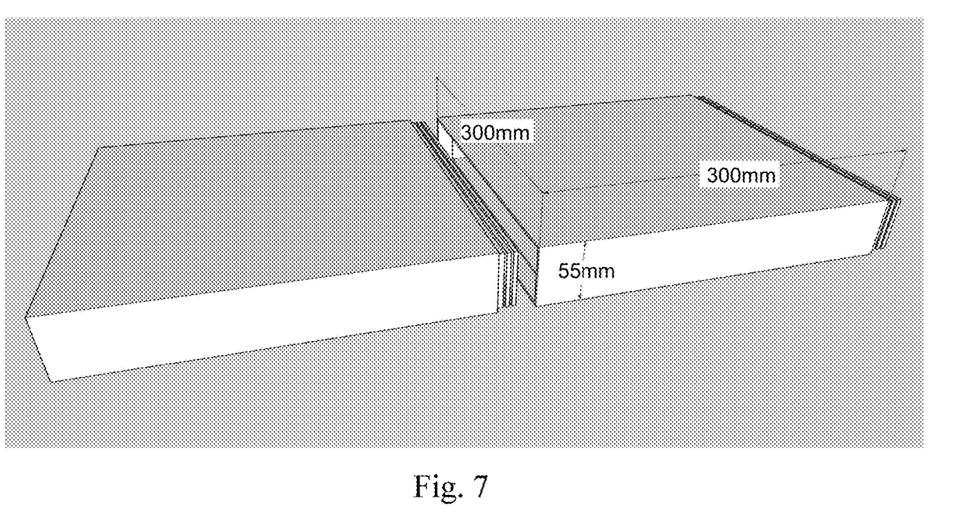
FIG. 7 shows one embodiment of the invention comprising an assembly of, high surface area energy storing, building element, which can be assembled as floor wall or ceiling.

The connection between the different assemblies have valves allowing air flow between the different parts, as can be seen in FIG. 6 (that shows the assembly of the element of FIG. 7)

Ventilation region refers to the volume in which the air is in contact with the hygroscopic material, such that heat and humidity transfer may occur.

Figure 8:
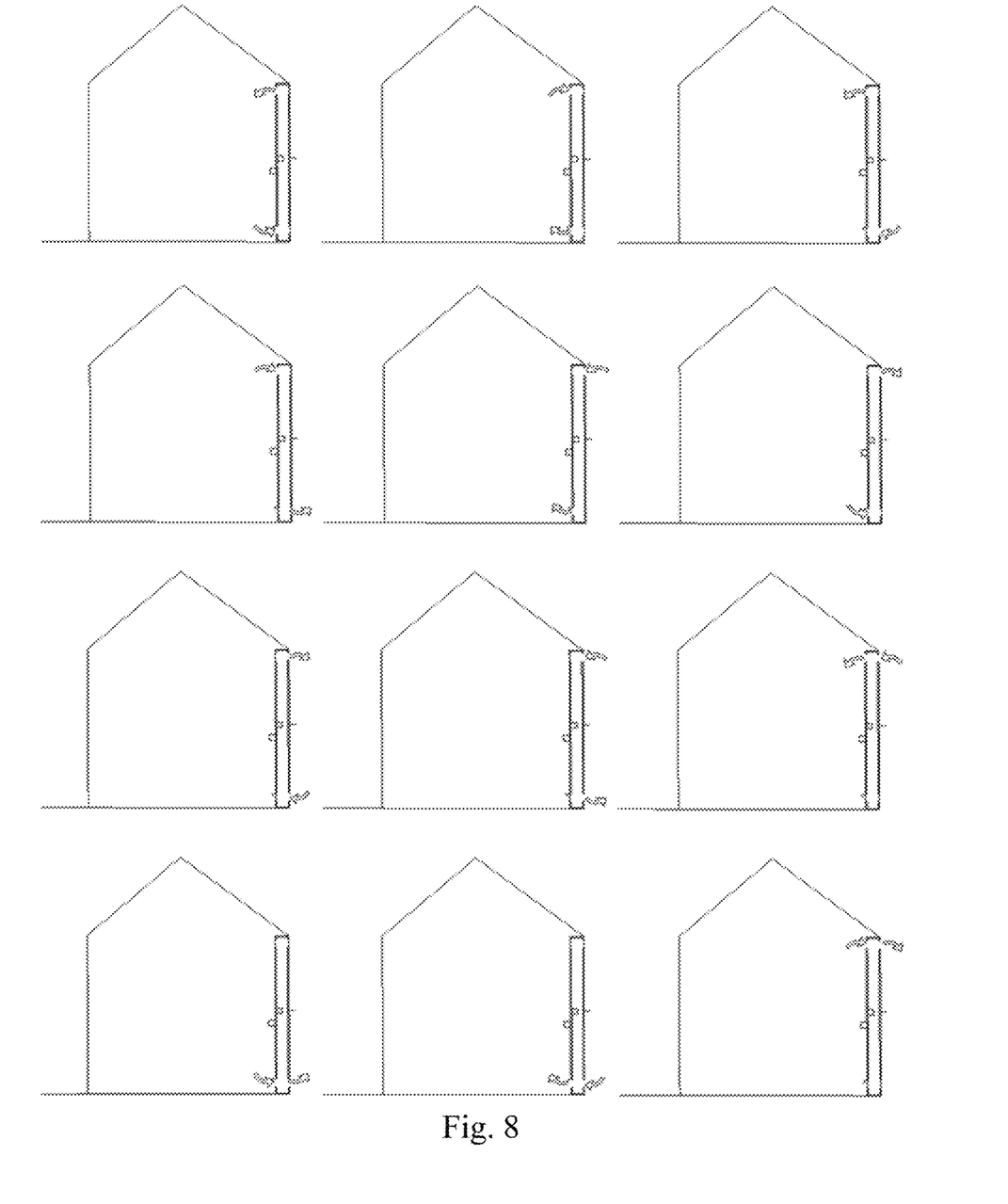
FIG. 8 shows possible airflow patterns for a 4 vent configuration.

The vents may be electronically controlled and will generally comprise a valve (such as a butterfly valve, a blind vent, or the like) for allowing or preventing air flow, and optionally a blower designed to force air to flow. By means of the vents and blower assemblies, air can be allowed or forced to flow through the channels of the invention, in contact with large masses of hygroscopic material. There may be several such vents, for example two vents connected to the outside of the building and two connected to the inside. Depending upon the ambient, internal, and expected future conditions of temperature and humidity, these four vents allow for four possible actions to be taken: for air to be forced from outside to outside, from inside to inside, from outside to inside, and from inside to outside, Specific flow can be conducted by using natural convection phenomena, For example, allowing hot air to rise and cool air to fall, as shown in FIG. 8. Vents can also be used without forcing air, by allowing passive temperature and humidity exchange when they are open. For example, a ceiling assembly can be opened towards the building interior during a hot dry day, and cool the air near the ceiling by evaporating water into it.

Figure 9:
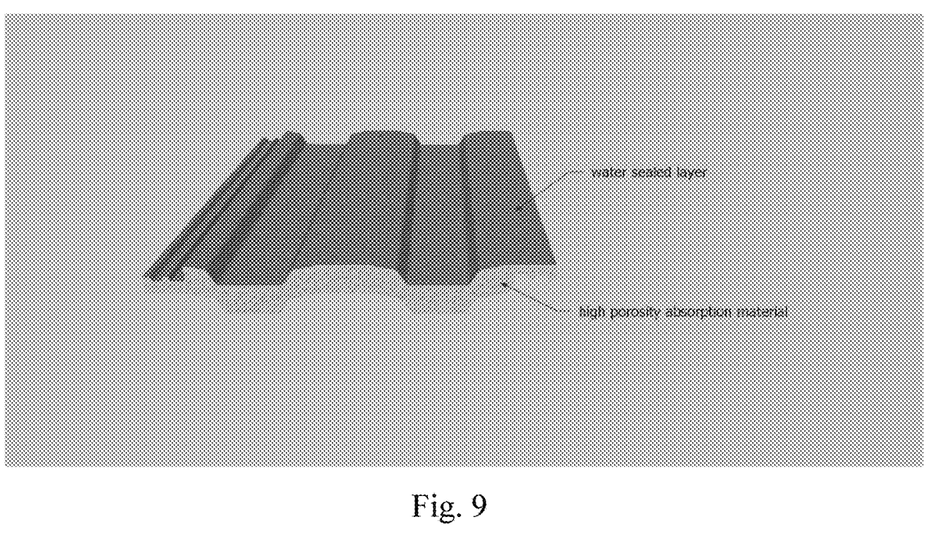
FIG. 9 shows an embodiment of the invention implemented as 'absorption roof shingles'.

A large passive inside vent: One specific case of passive vent operation can be as shown in FIG. 2 wherein the inside vent is enlarged to expose a large part of said airflow channels to the building interior volume, thus allowing passive transfer of air and water vapor from said hygroscopic material to said building interior. This possibility can be seen in FIG. 9 showing an 'absorption tile' that is encapsulated with an airtight seal on the outer side and having a highly porous structure in its inner side. When airflow is activated under the tile air exchange can be performed from the absorption material to the air flow.

Structural components are components comprising a quantity of hygroscopic material exposed to air within an adjacent ventilation region.

Ambient air refers in general to air outside the said assembly or structural component, unless stated specifically to be inside or outside air.

An airflow control system may be used to control these vents, again the control being based on the current and expected conditions of temperature and RH, as well as user preferences. For example if the user indicates that his or her comfort zone is between 18-23 C temperature and between 25%-65% RH, an algorithm may be employed to determine the expected effects of the four possible actions described above (based e.g. on a database of past actions and results, direct computation using equations of heat and mass transfer, or the like). If one of these actions is found to bring the interior conditions closer to the comfort zone, then this action can be taken.

Instead of defining a comfort zone per user, an average or estimated comfort zone may be used. Alternatively a 'summer mode' and 'winter mode' may be used. For instance in the 'summer mode' it may be assumed that cooling should be preferred, by desorbing water from the material, while in winter mode the heating should be preferred, by adsorbing water to the material.

For all of the modes of the invention, the hygroscopic material has to be 'regenerated', generally over a daily period. If the material is being used to moisten/cool the air, then it will gradually lose its water content which will have to be replaced if the process is to be repeated. This can generally be done at night, when the RH of the ambient air increases (reaching 100% when dew falls). As the material absorbs this moisture from the air, it will heat up, but the air that has been heated in this manner may be forced outside the building, and furthermore the airflow can occur over large periods of time. This is useful since the night air itself will generally be colder, and the heat transfer between large masses of cold air and the hygroscopic material can be used to offset the heating effect of its moisture absorption. During winter or when heating is desired all the effects will occur in the opposite direction; the material will gradually absorb moisture and heat air for building heating purposes, but will need to be dried for the next day or next period of heating. Thus during the day when the RH is low, large masses of air can be run through the hygroscopic material to dry it, and during the night interior humid air (for example) may be run through the hygroscopic material to be dehumidified and heated.

The assembly as a cinder block One common building technique involves a concrete or other 'skeleton' (floors/ceilings and columns) forming the structure of the building, with the walls filled in by means of cinder blocks or other nonstructural elements. These cinder blocks are used to form walls at low cost and serve no critical structural purpose. In one embodiment of the invention, a new 'cinder block' is introduced, allowing for use of a large mass of porous, hygroscopic material into any combination of the walls, floors, ceiling, or other building components. As will be appreciated by one skilled in the art, floors and ceilings may also comprise some fraction of hygroscopic material, or it may be used in tiling, or in coatings, or in any other way introduced as a structural or nonstructural building element. The only requirement is that a sufficient volume of the building structure be made to comprise hygroscopic material.

Encapsulation: there are different way for encapsulation by means of sealers, epoxies, glazing, membrane, films, paints or the like. It could be full or partly airtight depending on the embodiment required. Encapsulation can also be achieved by attaching an encapsulating element to one or more building element. In some embodiments, the material is largely or entirely encapsulated in an airtight envelope, but this is not a strict requirement, as the passive exchange with the surroundings may be sufficiently small when compared with the exchange during forced-air convection that it does not appreciably affect the system performance.

An example of partially encapsulated embodiment can be seen in FIGS. 2, 9

5.3.2 High Surface Area for Heat and Mass Transfer and Reservoir Efficiency

1. One way of understanding the surprising effectiveness of the method is to consider that many heating devices require large temperature differences. For example a radiator may be kept at 60 C, or a heating element at 600 C, in order to transfer enough heat to the surroundings as to be effective. In the case of the current invention, due to the overwhelmingly large surface area provided, a temperature difference as small as e.g. 5 C over ambient may be enough to provide a comfortable temperature to the building occupants, by rapidly heating or cooling the entire mass of interior air to this elevated or reduced temperature. The low temperature difference required for heat transfer allows 'deeper' use of the energy reservoir in the sense that temperature differences may be used 'down to the last degree'. Other methods require higher temperature differences and there are heat losses in doing so, as well as efficiency losses when the temperature difference is low.

2. Heat transfer, and humidity absorption and desorption occur naturally on the surfaces of walls ceiling, floors, and so on. The response time of the system is essential for the efficiency of the system, especially in low temperature and humidity differences. By allowing air to flow inside the material it is possible to enlarge the available surface area enormously (as will be described later in chapter 5.3.3 below, on the 3 dimensional structure). By this means the effect of thermal mass as we know it, and the effect of absorption and desorption will be enormously amplified.

5.3.3 The 3 Dimensional Structure

In one embodiment, building elements such as blocks are composed of a large percentage of hygroscopic material. Useful construction strength combined with a highly porous 3d structure, allows for a high surface area and corresponding rate of vapour mass transfer and capture and heat transfer. The building elements are formed in a 3d structure of high strength and optimized density, but at the same time high surface area. The internal structure of the building elements include three dimensional air channels allowing for rapid diffusion, adsorption and release of moisture. This is accomplished for instance by means of networks of coarse-to-fine channels such as those found in the arterial/venous systems, in lungs, tree roots or branches, and any other system requiring large surface areas for interphase exchange. This arrangement will allow for higher surface area than the currently employed random network of spheres, for instance.

Our invention can use traditional construction techniques that allow one to produce sealed, thermally driven adsorption-resorption building elements powered by ambient conditions.

5.3.4 Humidity Balance

In one embodiment of the invention, the hygroscopic material is used not only to control temperature, but to control indoor humidity as well. For example during hot days, the sensation of heat is compounded by high humidity; the 'comfort zone' takes this into account and requires lower humidities for higher temperatures to remain comfortable. Since for purposes of cooling, the invention requires increasing the humidity of the air in contact with the hygroscopic material, ambient (outside) air may be passed through the hygroscopic mass and back outside, allowing the walls/floor/ceiling to be cooled, while not introducing any extra humidity.

5.3.5 The Assembly as Different Embodiments

Some specific cases of embodiments of the invention are:
1. (i) Walls providing cooling/heating (FIGS. 3, 5)
   (ii) floor tiles providing underfloor cooling/heating. (FIGS. 4, 6, 7)
2. Roofing tiles which adsorb moisture during the night and evaporate during the day, thus keeping the tiles at lower temperature. In one embodiment a completely open system is used.
3. Inner or Outer additional elements. In the case of an already-built building, or from other reasons, one embodiment of the innovation uses elements that are added to the wall ceiling or floors. These elements can also operate autonomously, either working together or separately from other elements.

5.3.5.1 Absorption Roof Shingle and Absorption Layer Under the Roof

Major heat transfer into and out from the house occurs at the roof. Absorption roof shingles (FIG. 9) and absorption layers under the roof (FIG. 2) can lead to big improvements in the heat transfer through the envelope of the building, and thereby reduce heating and cooling costs.

Many roofs are made from ceramic shingles that already have a certain degree of humidity absorption due to their clay materials. We propose a novel high absorption and surface area shingle, that can absorb and desorb significant amounts of humidity, thereby heating and cooling respectively. In one embodiment the system could be without control, using the daily humidity and temperature change as described elsewhere.

5.3.5.2 Furniture

Integrating the absorption material in the building elements is just one possible embodiment of the invention. It is also possible to integrate it in other elements like furniture. A massive bench on the side of a wall, for example having dimensions 0.5 m by 0.6 m and 3 m in length contains a volume of 0.9 m3. If this volume is largely comprised of highly absorbent material, it could realistically absorb and desorb 100 kg of water from and into the air. In energy terms, this is about 100 KWh for each cycle. Assuming even a few full cycles in a season, this amount of energy could be enough for most cooling and heating requirements of a room.

This sort of element can be integrated in existing dwellings, as air conditioner is integrated, without a change to the structure.

5.3.6 Quantitative Example per Meter of Building

The amount of heat released/absorbed per kg water of water adsorbed or released is about 1 kwh/kg water, and several hundred kilograms of water may be absorbed per cubic meter of building material, depending on the porosity, surface area, and hygroscopic material properties. When one considers that the yearly heating load may be around 20 KWh/m^2 (e.g. for a Mediterranean climate), the water storage equivalent for an entire year of airconditioning would be around 33 kg/m^2 of water storage, which can actually be reached with normal materials and thick walls of e.g. 30 cm (assuming water storage of 100 g/kg in the desiccant). Furthermore the energy required for heating/cooling need not be stored over a year, since fluctuations over smaller periods e.g. one day can also be usefully exploited.

5.4 Detailed Embodiment of a Wall Assembly

Figure 10:
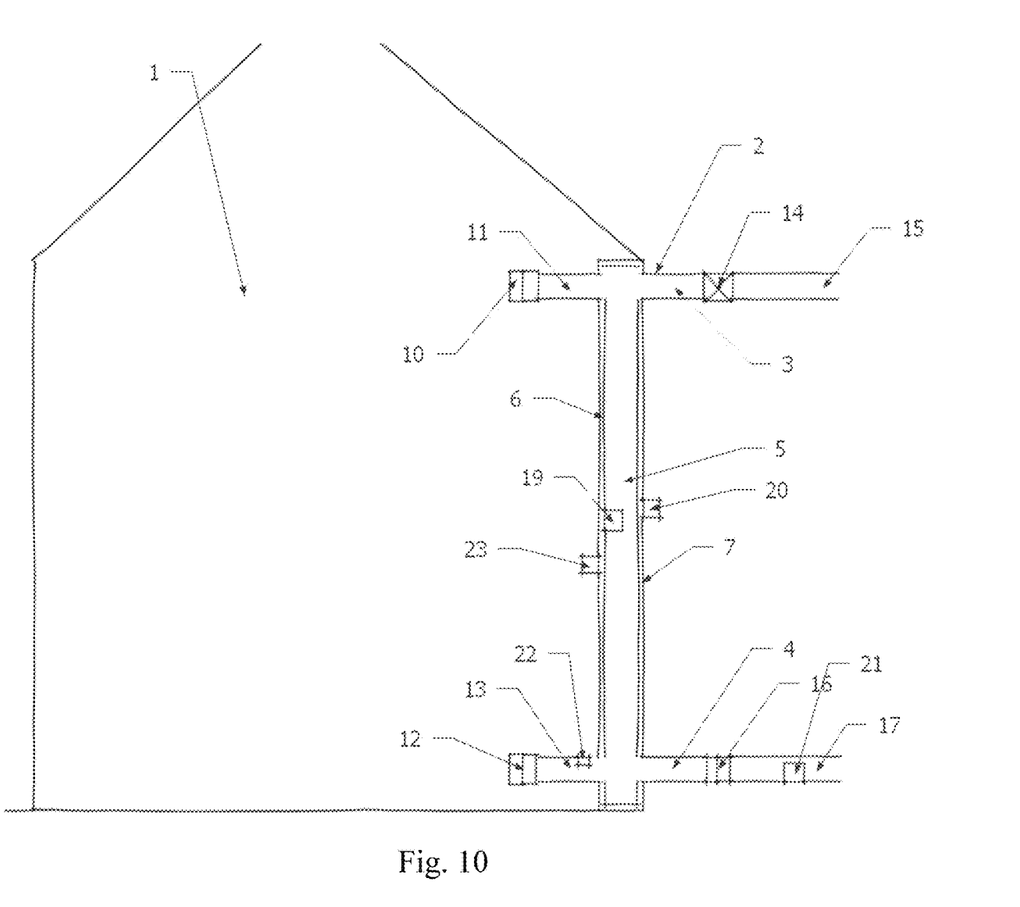
FIG. 10 shows a possible embodiment of the physical system.

A possible embodiment of the physical system is shown in FIG. 10:

The main part of the embodiment constitutes some of a building's (1) wall sections (2) but other possible embodiments can be built using detachable panels on existing walls. The wall sections (2) are encapsulated with humidity blocking material such as paint, plastic or some form of glazing. In the encapsulated part of the wall there is a porous hygroscopic material (5) filling most of the wall section volume.

The material can be arranged in a geometrical pattern that will maximize the surface area and airflow through the material (such as zigzag, or angles, not shown).

The part of the wall that faces the building interior (6) has 2 vents, high (11) and low (13), that allow airflow to and from the building interior. These vents are controlled by 2 corresponding switchable valves (10, 12).

The part of the wall that faces the building exterior (7) also has 2 vents, high (3) and low (4), that allow airflow to and from the building exterior. The upper vent is coupled to an air blowing system, fan, (14) that can force air in both directions, either from the outside in (from vent 15 towards vent 3), or from the inside out (from vent 3 towards vent 15).

The fan (14) can be turned off to minimize air passage in the vent. More switchable valves can be added, i.e. coupled to fan (14) to allow even better control of the humidity conditions inside the wall, but for a basic usage example they are not critical.

The temperature and humidity of the external air are monitored using a temperature and humidity sensor (20).

The temperature and humidity of the air in the lower internal vent (13) are also monitored using a temperature and humidity sensor (22).

The temperature and humidity of the air inside the building are monitored using a temperature and humidity sensor (23) located inside the building, in contact with the internal air.

Figure 11:
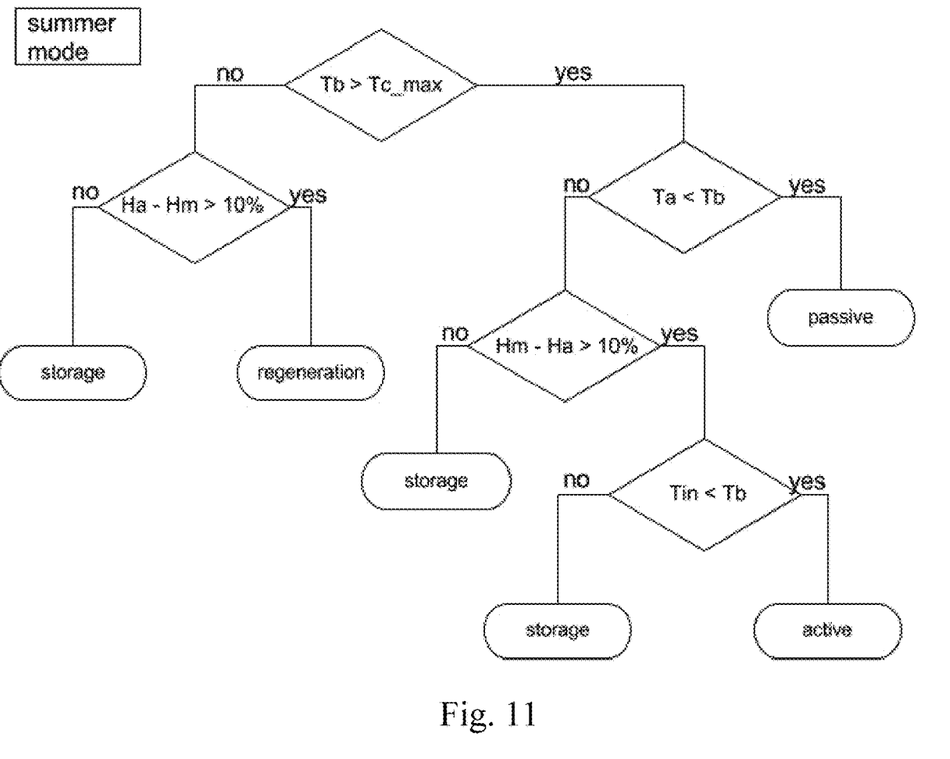
FIG. 11 shows an example embodiment of a summer mode algorithm including cooling-cycle algorithm and a summer mode regeneration-cycle algorithm.
Figure 12:
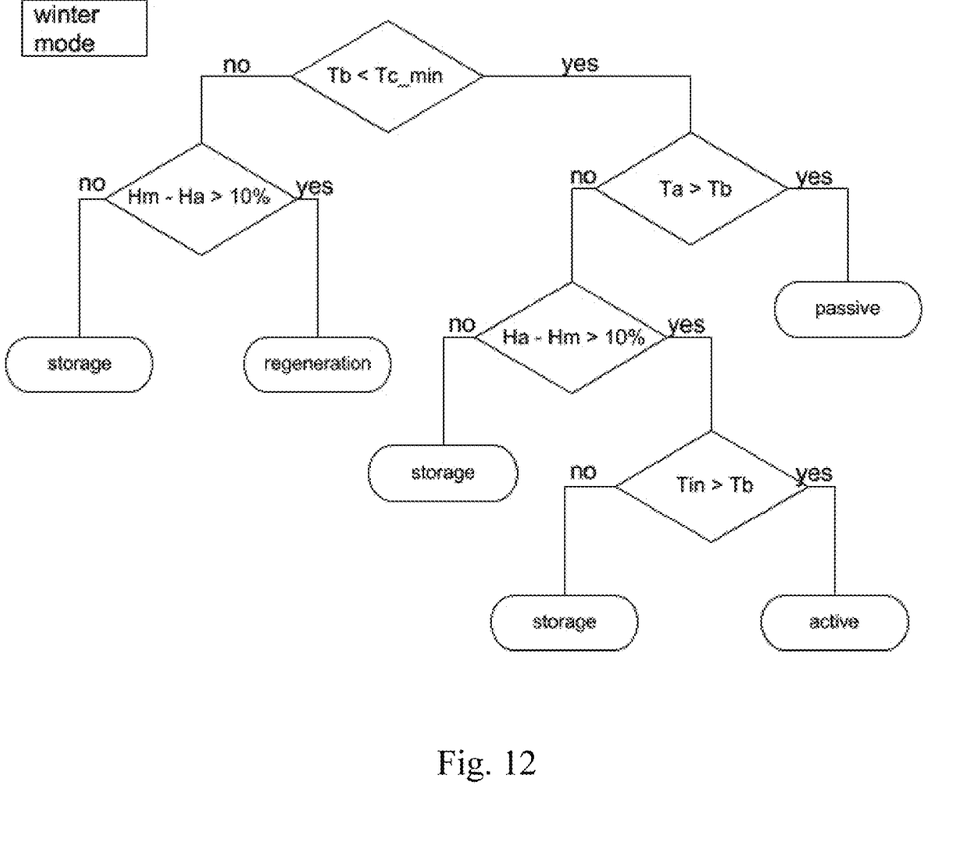
FIG. 12 shows an example of an embodiment of a winter mode algorithm including heating-cycle algorithm and a winter mode regeneration-cycle algorithm.

Air can flow through the hygroscopic material in several different paths, dictated by different combinations of the switchable valves (10,12,16) states (open/closed) and the fan (14) states (forcing air in, sucking air out, turned off). The specific path is decided upon using a scheme based on the sensors (19,20,21,22,23) readings and the general mode that was either set by the user (cooling/summer mode or heating/winter mode) or decided upon by the control algorithm considering local weather forecast and the user's usage patterns. One example of a simple decision scheme is demonstrated in FIG. 11 (for summer/cooling mode) and FIG. 12 (for winter/heating mode), based on the following airflow paths and definitions:

Definitions of Parameters:

Comfort temperature range for the building interior: from Tc_min to Tc_max.

The temperature inside the building, given by sensor 23: Tb.

The outside (ambient) air temperature and humidity, given by sensor 20: Ta for temperature, Hm for relative humidity.

The air temperature on vent 17, given by sensor 21: Tout.

The air temperature on vent 13, given by sensor 22: Tin. Tin can be measured during the active mode after several minutes of active airflow.

The temperature and relative humidity of the hygroscopic material, given by sensor 19: Tm for temperature, Hm for relative humidity. This sensor (19) can be omitted in certain configurations by comparing Tb and Tin to measure whether the hygroscopic material is cooling (Tb>Tin) or heating (Tb<Tin) rather than checking the state of the hygroscopic material directly.

Definitions of Possible Airflow Paths and Modes of the System:

1. Active mode:
   Valves 10 and 16 are closed. Air enters from vent 15, pass through the activated fan 14, through vent 4 to the hygroscopic material, and out into the building from vent 13 and the open valve 12.
2. Passive mode:
   Valves 12 and 16 are closed. The fan 14 is pushing air into the building, without passing through the hygroscopic material, through vents 3 and 11, and the open valve 10.
3. Regeneration mode:
   Both interior valves (10,12) are closed, and the fan 14 is pushing air into the hygroscopic material and out of open valve 16.
4. Storage mode:
   All valves are closed and the fan is turned off.

Please note that in order to find out what Tin is, the system should be in active mode for several minutes. A more elaborate system can be achieved by having a fan and a valve on each one of the air vents (11,13,15,17). That would allow other airflow paths such as:

5. Internal regeneration/activation mode:
   The 2 internal fans work in unison to suck air from the higher/lower internal opening, force it through the hygroscopic material, and back into the building from the lower/higher internal opening. The 2 exterior fans are turned off and the 2 exterior valves are closed. The exact path (lower to higher, higher to lower) can be selected to utilize the contribution of convective forces of the air (hot air rises, cold air sinks) in order to reduce the load on the fans or even disable them completely at certain conditions.
6. Convective cooling mode:
   All fans are turned off. The upper external valve and the lower internal valve are open. Air that was cooled in the hygroscopic material will flow downwards due to its higher density, creating a passive air motion that cools the building. This passive motion can also be assisted by activating some of the fans.
7. Convective heating mode:
   All fans are turned off. The lower external valve and the upper internal valve are open. Air that was heated in the hygroscopic material will flow upwards due to its lower density, creating a passive air motion that heats the building. This passive motion can also be assisted by activating some of the fans.

Humidity Cooling Threshold:

In order to cool the building using humidity exchange, the hygroscopic material should be moist "enough" compared to the entering air, so that the entering air will evaporate water from the hygroscopic material, leading to cooling of the entering air and the material itself. "Enough" in this case is when air in vapor pressure equilibrium with the hygroscopic material is more humid than the air that enters the assembly (either from outside the house or from inside the house).

Humidity Heating Threshold:

In order to heat the building using humidity exchange, the hygroscopic material should be dry "enough" compared to the entering air, so that the entering air will evaporate water from the hygroscopic material, leading to heating of the entering air and the material itself. "Enough" in this case is when air in vapor pressure equilibrium with the hygroscopic material is less humid than the air that enters the assembly (either from outside the house or from inside the house).

A more advanced control scheme can be devised, to enhance the user experience even further, by combining one or more of the following:

Future predictions of meteorological conditions.

Normal behavior patterns of the user (working hours, weekends, etc.)

Special requirements of the users (sick at home, family visit, birth of a child).

Predictions regarding the system behavior based on accumulated usage data.

What is claimed is:

1. A method for moisture-enhanced cooling of at least part of a building, the method comprising the steps of:
   (a) providing at least one structural component integrated into the building, said structural component comprising a quantity of hygroscopic material exposed to air within an adjacent ventilation region;

(b) monitoring humidity of air in the ventilation region and of ambient air;

(c) during a charging for cooling period, generating air transfer between the ambient air and the ventilation region when the humidity of the ambient air is greater than the humidity of the air in the ventilation region and interrupting said air transfer if the humidity in the ambient air falls below the humidity of the air in the ventilation region; and (d) during a cooling period, generating air transfer between the ambient air and the ventilation region when the humidity of the ambient air is lower than the humidity of the air in the ventilation region and interrupting said air transfer if the humidity of the ambient air rises above the humidity of the air in the ventilation region;

wherein, the water needed to perform cooling is harvested from said ambient air without using any external source of water, and the hygroscopic material is integrated into the building saving space, costs and improving heat transfer efficiency and reservoir efficiency.

2. The method of claim 1 further defining a next-expected requirement as either a heating requirement or a cooling requirement and further comprising the steps of:

(a) when the next-expected requirement is cooling:
  (i) during a charging for cooling period, generating air transfer between the ambient air and the ventilation region when the humidity of the ambient air is greater than the humidity of the air in the ventilation region and interrupting said air transfer if the humidity in the ambient air falls below the humidity of the air in the ventilation region; and
  (ii) during a cooling period, generating air transfer between the ambient air and the ventilation region when the humidity of the ambient air is lower than the humidity of the air in the ventilation region and interrupting said air transfer if the humidity of the ambient air rises above the humidity of the air in the ventilation region; and (b) when the next-expected requirement is heating:
  (i) during a charging for heating period, generating air transfer between the ambient air and the ventilation region when the humidity of the ambient air is lower than the humidity of the air in the ventilation region and interrupting said air transfer if the humidity in the ambient air rise above the humidity of the air in the ventilation region; and
  (ii) during a heating period, generating air transfer between the ambient air and the ventilation region when the humidity of the ambient air is greater than the humidity of the air in the ventilation region and interrupting said air transfer if the humidity of the ambient air falls below the humidity of the air in the ventilation region;

wherein heating, cooling, humidification, and dehumidification are obtained using conditions of moisture and dryness harvested from said ambient air, without using any other external water or other external energy source except for the energy needed for said airflow control system; and said hygroscopic material is integrated into the building saving space, costs and significantly improving heat transfer efficiency and reservoir efficiency.

3. The method of claim 2, wherein said structural component is selected from the group consisting of: part of a wall of the building; part of a floor of the building; part of a ceiling of the building; part of a roof of the building; as furniture or as as roof shingles.

4. The method of claim 2, wherein the structural component is part of an encapsulated assembly encapsulated to prevent humidity exchange between the hygroscopic material and air outside the assembly, arrangement of and wherein the ventilation region is an airflow channels passing through the assembly.

5. The method of claim 2 further wherein:
(a) monitoring humidity of indoor air
(b) generating airflow in one of the following paths:
  (i) from outside said building, through said hygroscopic material, to outside said building;
  (ii) from inside said building through said hygroscopic material to inside said building,
  (iii) from outside said building through said hygroscopic material to inside said building;
  (iv) and from inside said building through said hygroscopic material to outside said building;
(c) choosing one of said paths by an algorithm determining an expected effect of the four possible actions described above, and if one of these actions is found to bring interior conditions closer to the predefined comfort zone conditions considering both the thermal mass and hygroscopic effects of said hygroscopic material, taking this action.

6. The method of claim 2 wherein air transfer between said ambient air or indoor air and said ventilation region can also be generated without forcing air flow, by allowing passive heat and humidity exchange.

7. The method of claim 2 further performing heat exchange between ambient air and indoor air, allowing cool indoor air to cool ambient warm air or allowing hot indoor air to heat ambient cold air.

* * * * *